United States Patent [19]
Voss et al.

[11] Patent Number: 5,786,529
[45] Date of Patent: Jul. 28, 1998

[54] SEARCH GAS DETECTOR WITH VACUUM PUMP AND PROCESS FOR OPERATING SUCH A SEARCH GAS DETECTOR

[75] Inventors: Gunter Voss, Much; Anno Schoroth, Konigswinter, both of Germany

[73] Assignee: Leybold Aktiengesellschaft, Germany

[21] Appl. No.: 586,795

[22] PCT Filed: Jul. 14, 1994

[86] PCT No.: PCT/EP94/02309

§ 371 Date: Feb. 1, 1996

§ 102(e) Date: Feb. 1, 1996

[87] PCT Pub. No.: WO95/04920

PCT Pub. Date: Feb. 16, 1995

[30] Foreign Application Priority Data

Aug. 5, 1993 [DE] Germany .................... 43 26 264.3

[51] Int. Cl.[6] .................................................. G01M 3/20
[52] U.S. Cl. .................................................. 73/40.7
[58] Field of Search .................................................. 73/40.7

[56] References Cited

U.S. PATENT DOCUMENTS

| | | | |
|---|---|---|---|
| 3,280,619 | 10/1966 | Spies | 73/40.7 |
| 3,867,631 | 2/1975 | Briggs et al. | 73/40.7 X |
| 4,419,882 | 12/1983 | Ishii et al. | 73/40.7 |
| 4,459,844 | 7/1984 | Burkhart | 73/40.7 |
| 4,492,110 | 1/1985 | Bergquist | 73/40.7 |
| 4,776,207 | 10/1988 | Holme | 73/40.7 |
| 5,131,263 | 7/1992 | Handke et al. | 73/40.7 |

FOREIGN PATENT DOCUMENTS

| | | |
|---|---|---|
| 0352371 | 11/1988 | European Pat. Off. . |
| 1310657 | 7/1985 | U.S.S.R. . |
| 8804774 | 6/1988 | WIPO . |

*Primary Examiner*—Michael Brock
*Attorney, Agent, or Firm*—Wall Marjama & Bilinski

[57] ABSTRACT

A search gas detector for leak detection instruments includes a gas inlet, a vacuum pump, and an apparatus by which the presence of a search gas is recorded. The vacuum pump is able to pump all reactive gases and the search gas recording apparatus is able to detect enrichments of the search gas. More preferably, the gas inlet is effective for permitting only the search gas to pass therethrough, the detector having a pair of chambers, the first to which the gas inlet and search gas apparatus are connected, and the second to which the vacuum pump is connected. The two chambers are interconnected by a constrictive line with the first chamber having a relatively large volume in relation to the second chamber.

7 Claims, 2 Drawing Sheets

5,786,529

SEARCH GAS DETECTOR WITH VACUUM PUMP AND PROCESS FOR OPERATING SUCH A SEARCH GAS DETECTOR

BACKGROUND OF THE INVENTION

The invention relates to a search gas detector, preferably for leak detection instruments, with a gas inlet, with a vacuum pump and an apparatus through which the presence of search gas is recorded. Moreover, the invention relates to a method for operation of a leak detector of this kind.

In the case of high-sensitivity leak detection, chiefly only helium is considered as the search gas. Therefore, in the following text, mainly helium is referred to as the search gas.

In helium leak detection instruments, mass spectrometers are commonly employed as detectors which are set to the mass of helium. Operation of a mass spectrometer requires a high vacuum pump system (high vacuum pump, backing pump etc.) through which the helium entering in the case of a positive test, is removed (refer to DE-A-34 21 533, for example).

From EU-A-352 371 a helium leak detector of the kind affected here, is known. A getter ion pump is employed as the vacuum pump. Even relatively small getter ion pumps are heavy in weight and thus unhandy.

SUMMARY OF THE INVENTION

It is the task of the present invention to significantly reduce the complexity in the generation of the vacuum for search gas detectors, helium detectors for leak detection instruments, in particular.

According to the present invention this task is solved for a search gas detector of the aforementioned kind, by the vacuum pump being an adsorption pump. Adsorption pumps are small and light in weight, so that a leak detection instrument which is equipped with a detector of this kind, is easier to handle.

Since the total operating time of an adsorption pump depends on the quantities of gas which arise, it is expedient that the gas inlet has the property of admitting the search gas in a preferred manner. Thus it is possible to perform an acceptable number of measurements.

The task of the present invention can be solved for a search gas detector of the aforementioned kind, in that the vacuum pump has the property to substantially pump all gases—except the search gas—and where the search gas recording apparatus has the ability to detect an enrichment of the search gas. Also in the case of this solution it is—for capacity reasons—expedient when the gas inlet too has a characteristic which allows a preferred admission of the search gas. In the case of a positive leak test, the search gas enters through the gas inlet. Since the vacuum pump does not pump the search gas, the search gas accumulates and thus gives rise to a pressure increase. Already with a sufficiently sensitive pressure gauge it is possible to determine this pressure increase, and employ it for the formation of measured values.

A preferred method for operating a search gas detector of the aforementioned kind is thus characterised by a vacuum pump having the ability to substantially only pump the components which accompany the search gas—generally air—so that the gas applied to the search gas recording apparatus leads to an increase in the partial pressure and so that the change in the partial pressure may be recorded and evaluated in a differential manner. If this change in the partial pressure occurs by accumulation at the location of the search gas detector, analyses of leaks may be performed at a high sensitivity.

Further positive measurements cause further pressure increases so that the service life also of a helium detector according to this proposal is limited. In order to attain a sufficiently long service life, the admission system must, on the one hand be designed in such a manner that it will practically only let helium pass, so that pressure increases owing to other gases are avoided. On the other hand, the pressure gauge must be extremely sensitive, so that very small pressure increases may be recorded, i.e. so that until the upper pressure limit is attained, as many leak measurements may be conducted as possible.

The gas admission system comprises preferably a polymer diaphragm which separates the high vacuum from a test volume or a sample gas flow. Polymers are a class of material which is described in great detail in the handbooks. Due to the permeation properties stated for each material of this class, the expert is in a position to select such a diaphragm material in each case which has the desired selective properties. The desired selective property in each case, for example the preferred passage of the search gas should be as prominent as possible, so that the desired effect—the suppression of other gases, contamination etc.—is achieved in the best possible manner.

The material and the geometrical dimensions must be so selected that the conductance limits described below are not exceeded. It has been found preferable to employ FEP which lets helium permeate very well, and the permeation characteristic of which for accompanying gases is only moderate, so that the desired helium enrichment effect results. Also quartz glass may be employed at the gas inlet as published in EU-A-352 371, for example. At increased temperatures, quartz glass is only permeable for helium.

A sufficiently sensitive pressure gauge is the mass spectrometer, for example. If set to the mass of helium, it will then supply an ion current which is proportional to the partial pressure of the helium. In conventional leak detecting instruments, an ion current signal thus results which is proportional to the leak rate. However, if it is employed in a helium detector of the kind according to the present invention, then the ion current chiefly only represents the history, i.e. the amount of helium which has accumulated during the time of the preceding measurements. In the case of a further positive measurement the ion current thus changes only by a very small amount. The leak rate qHe is therefore only represented by the differential quotient, specifically:

$$q_{He} = a \times \frac{dI}{dt}$$

It is thus expedient to apply the current signal delivered by the mass spectrometer to a high-sensitivity current-to-voltage converter. This is, within the scope of the present invention, preferably designed as a differentiating stage, the amplification of which increases with rising frequency. The passive components of the differentiating stage are to be so rated that the differentiating conditions are chiefly met for the characteristic periods which occur during the measurement process or for the corresponding frequencies.

A vacuum pump which has the ability to substantially pump all gases—except helium—may be, for example, an adsorption pump with a suitable getter material (for example, a Zr-V-Fe mixture or the active getter material SAES 701). Getter materials of this kind only pump reactive components, i.e. mainly nitrogen, oxygen and water vapour. With respect to noble gases it behaves passively. Getter modules of the kind mentioned which require only a few g of a suitable getter material are—in comparison to high vacuum pumps like diffusion pumps, turbomolecular pumps, getter ion pumps etc.—light in weight, small and cost-effective.

BRIEF DESCRIPTION OF THE DRAWINGS

Further advantages and details of the present invention shall be explained by referring to the design examples presented in drawing FIGS. 1 to 3.

Drawing

Drawing

Drawing

Drawing

Drawing

DESCRIPTION OF THE INVENTION

Figure 1:
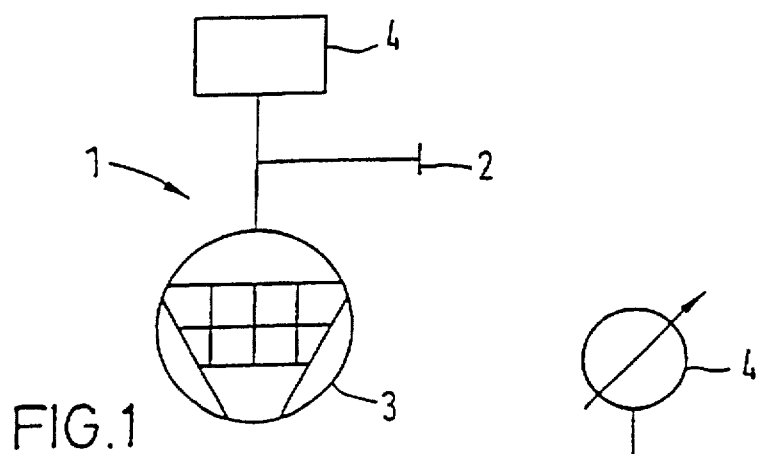
FIG. 1 shows a search gas detector according to the present invention with an adsorption pump as the vacuum pump.

The search gas detector 1 according to drawing FIG. 1 comprises gas inlet 2, to which a test chamber, a sniffer or also a test body itself is connectable, the vacuum pump 3 designed as an adsorption pump, and the search gas recording apparatus 4 which is designed, for example, as a mass spectrometers set to the mass of the search gas. Further means for processing and displaying the measured values are not shown.

The getter material within the vacuum pump should, in the implementation according to drawing FIG. 1, possibly pump all gases which enter through the inlet 2 including the search gas. As long as the adsorption pump maintains a pressure which permits operation of the mass spectrometer 4, the search gas detector is ready for operation. Preferably the inlet 2 is so designed that it allows only the search gas to pass. Occupation of the getter material by other gases or an undesirably rapid reduction in the pumping speed of the adsorption pump can thus be avoided.

Figure 2:
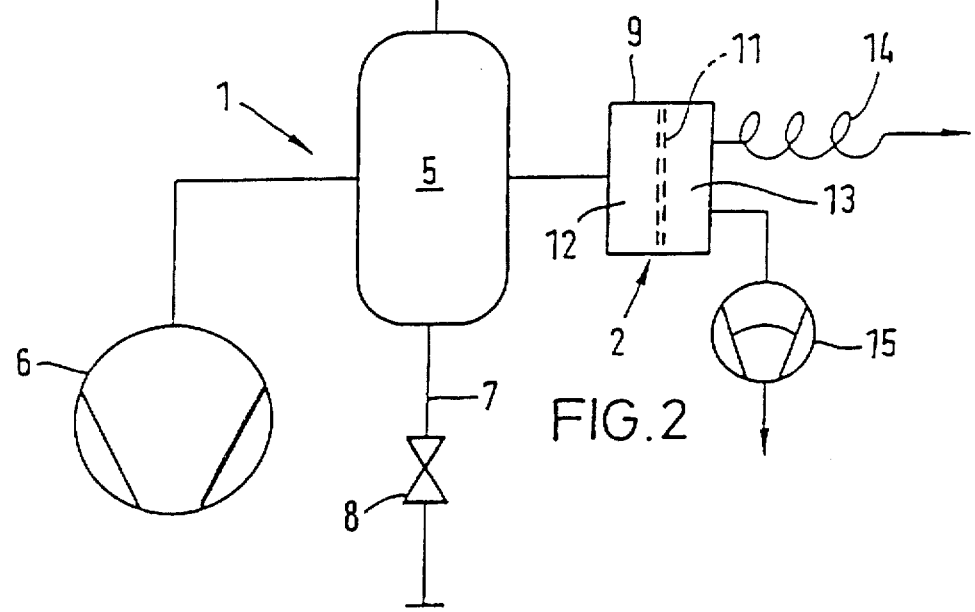
FIG. 2 shows a design example according to the present invention with a chamber.

In the design example according to drawing FIG. 2, a chamber 5 is provided, to which the inlet 2, the search gas recording apparatus 4 and the vacuum pump 6 are connected. In addition, a line 7 incorporating valve 8 is provided through which the chamber 5 may be evacuated. Part of the inlet 2 is chamber 9 which is divided into two spaces 12 and 13 by diaphragm 11. Space 12 is linked to vacuum chamber 5. Connected to space 13 is a sniffer hose 14 through which, during sniffer operation, the gas which is to be analysed as to the presence of the search gas, is sucked in with the aid of supply pump 15 and pumped through space 13.

Vacuum pump 6 is represented by the general symbol for a vacuum pump of any kind. In the design example according to drawing FIG. 2 it shall have the ability to substantially pump all gases—with exception of the search gas. Adsorption pumps with the already aforementioned getter materials have such an ability. For example, the SAES 701 active getter material pumps only reactive components, i.e. chiefly nitrogen, oxygen and water vapour. With respect to noble gases—argon and helium in this case—it responds passively. Helium which enters into chamber 5 through diaphragm 11, thus causes a pressure increase in chamber 5. This pressure increase can be detected with a sensitive pressure gauge 4.

Figure 3:
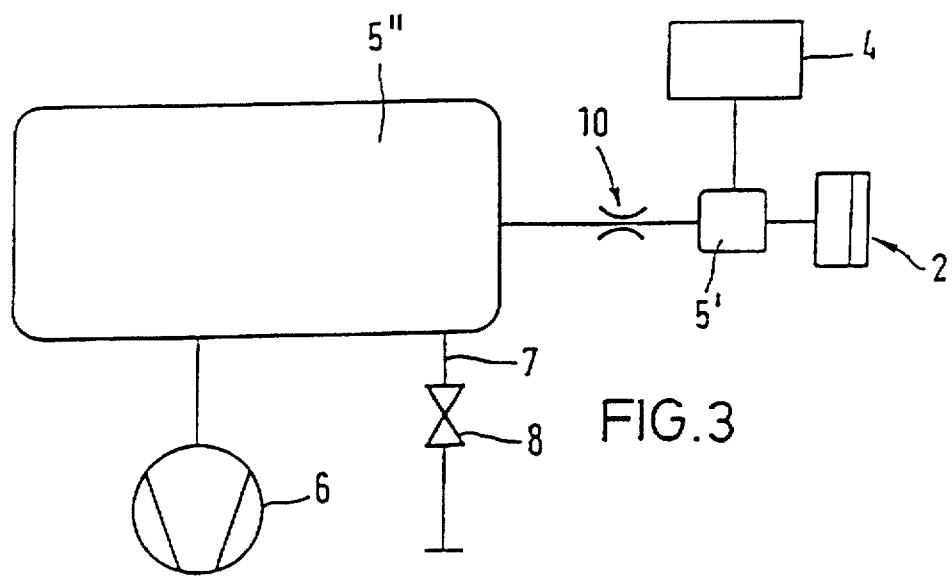
FIG. 3 shows a modified design example according to drawing FIG. 2.

In the design example according to drawing FIG. 3, the chamber 5 is replaced by a first chamber 5' having a relatively small volume to which inlet 2 and the search gas recording apparatus 4 are connected, and by a second chamber 5" having a relatively large volume, to which the vacuum pump 6 is connected, and by a line with constriction 10 which has a very low conductance linking chambers 5' and 5". The chambers 5' and 5" as well as constriction 10 must be so rated that the small volume may react rapidly and by large pressure increases (increasing the sensitivity) to the gas quantities which occur during leak searching. The large volume ensures a long operating time. Due to the small conductance of the link, it will of course attain its equilibrium with the small volume within a period of time which is long compared to the changes to be expected during the measurement process. The gain in sensitivity approximately corresponds to the ratio between the two volumes.

Figure 4:
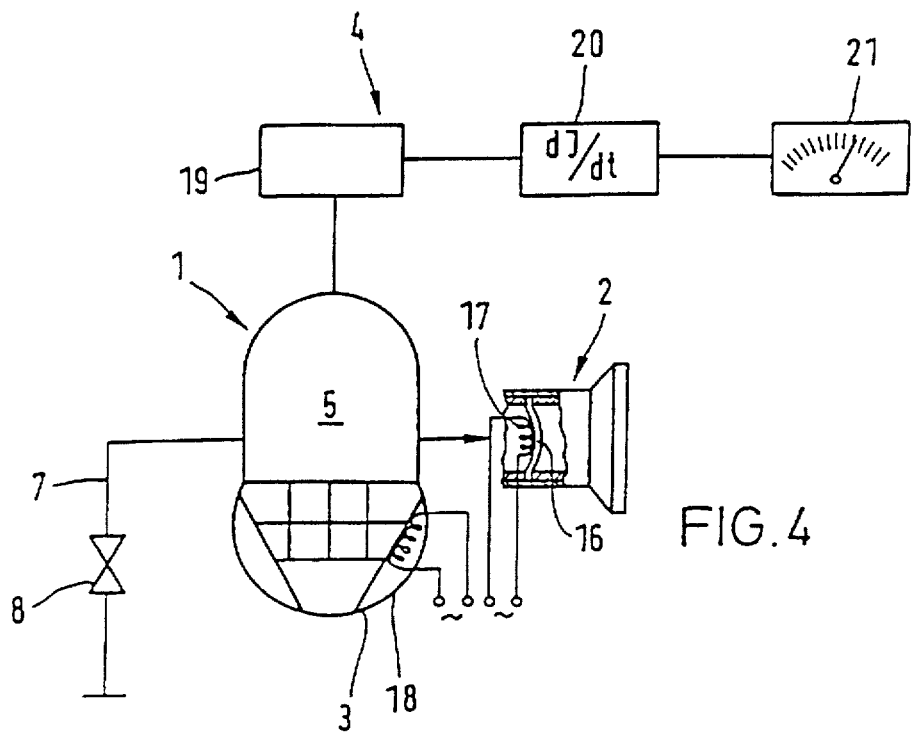
FIG. 4 shows a further design example whereby the formation of the measurement values is performed through a differentiating stage.

In the design example according to drawing FIG. 4, adsorption pump 3 and chamber 5 have been integrated. Part of the gas inlet 2 is a connection port with a quartz window 16, which is heatable by means of a heater 17. The quartz window 16 forms directly the interface to a vessel (a leak testing chamber, sputtering apparatus etc.) which is to be monitored for the presence of helium. At room temperature, the quartz glass is gas-tight; at elevated temperatures (900° C. approx.) it permeable for helium.

Also the adsorption pump 3 is equipped with a heater 18, through which the getter material is activated. Also in the case of this design example, a getter material has been selected which substantially only pumps reactive gases.

As a pressure gauge 4, only mass spectrometer 19 is present, being represented by a block. The measured value is indicated on display 21 via differentiating stage 20.

In order to put a search gas detector according to drawing FIGS. 2, 3 and 4 into operation, at first chamber 5 (or the chambers 5', 5") is evacuated via line 7 incorporating valve 8 with the aid of a conventional high vacuum pump. After a pressure of approximately $10^{-5}$ mbar has been attained, the getter material is activated according to the manufacturer's recommendations. In the design example according to drawing FIG. 4 this activation is performed by heating the getter material for a certain period of time (20 minutes, for example) to an elevated temperature (450° C., for example). Next, the valve 8 is closed, and the temperature of the getter material is reduced to its operating temperature (200° C., for example). Thereafter, the high vacuum pump is no longer required. When maintaining certain limit values for the conductance mentioned below, it is possible to attain operating periods of one year or more. Then the process which has been described must be repeated. This step represents a regeneration, since the accumulated gases are removed by suction and because thereafter the sorption substance is available again. Only after the capacity limit of the sorption substance has been attained will it be necessary to exchange the same.

It is important that the inlet system 2 only admits quantities of gas which are so small, that acceptable measurement periods result. In experiments, a period of one year was assumed. If also assuming the use of a diaphragm 11 made of FEP, a permissible argon pressure of $10^{-5}$ mbar and a volume of one liter for chamber 5, then the permanent argon flow must not exceed $3 \times 10^{-13}$ mbar l s$^{-1}$ for a service period of one year. Since air contains approximately 1% argon, the conductance limit of the system for argon is thus three times $10^{-13}$ I s$^{-1}$. Similar considerations lead to conductance limits for nitrogen, oxygen and water vapour. Since the getter material does not pump helium and argon, the pressure rises steadily. However, this pressure rise is so small that service periods of one year or more are possible. It is only important to be able to detect the pressure increase caused by the helium in the case of positive leak measurements. For this, a method of measurement is proposed below.

In order to suppress the continual permeation of argon and helium from the air during standstill, the diaphragm is sealed. This can be performed through a suitable valve mechanism or by exposing the diaphragm to a gas having a high molecular weight (SF$_6$, for example), which no longer permeates. This increases the amount of measurement time effectively available.

The system features a high level of selectivity for helium. Both the diaphragm and the getter material represent mechanisms of enrichment. For less demanding designs, the mass spectrometer may be replaced by an ionization vacuum gauge, which detects the increasing helium partial pressure in the presence of the steadily increasing argon pressure.

The getter material used, also pumps hydrogen. The gas spectrum in the mass spectrometer thus only exhibits a very small hydrogen amplitude. Thus the classic requirement concerning a very good separation between mass 2 and 4 is relaxed considerably. Instead of the common magnetic sector mass spectrometer, thus also cheaper and smaller low-resolution Quadrupoles may be employed.

The estimation described, is based on the use of a polymer diaphragm made of FEP which allows the passage of argon and helium. The use of a heatable quartz window is more advantageous, in as much heated quartz glass only allows the passage of helium.

Figure 5:
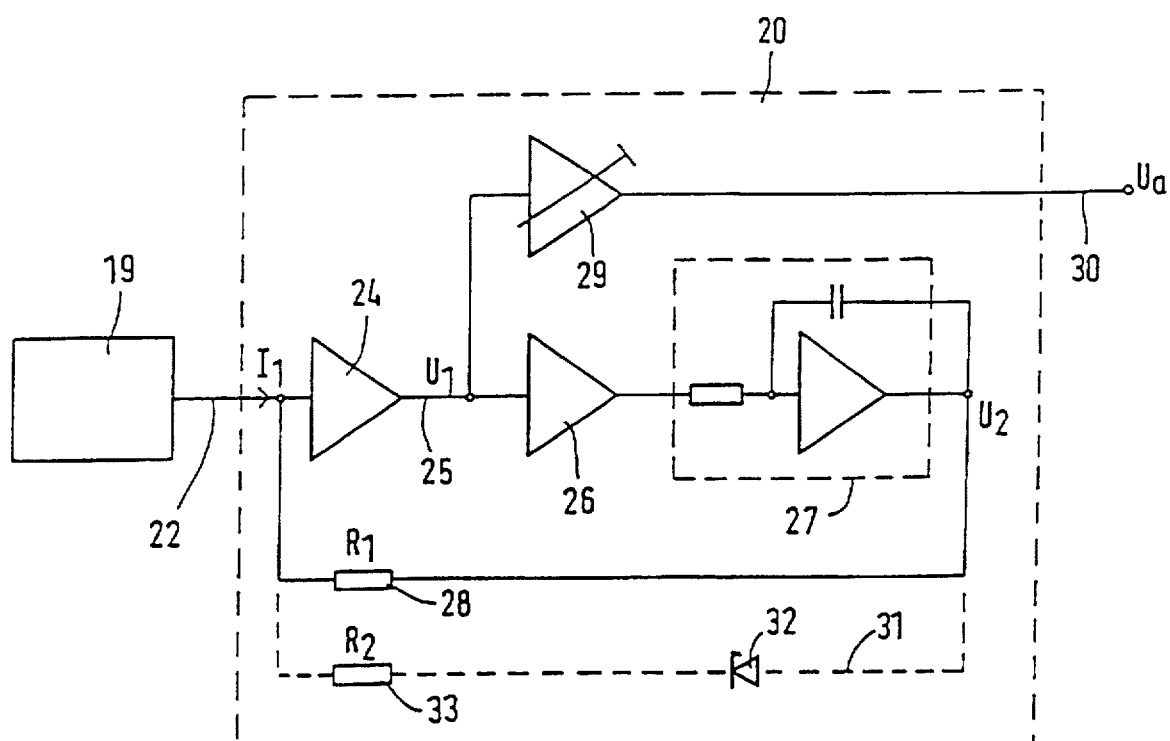
FIG. 5 shows a circuit example for a differentiating stage.

An example for a differentiating stage 20 is presented in drawing FIG. 5. It follows after the mass spectrometer 19 and comprises input (operational) amplifier 24, the output 25 of which is connected via an inverting amplifier 26 and an inverting integrator 27, and a resistance R$_1$ 28 at input 22.

The output 25 of the input amplifier is applied via an amplifier 29 (with selectable) amplification factor V$_a$ to the output 30 of the differentiating stage.

The following applies:

$$U_a = V_a \times U_1 \quad \text{(Eq. 1)}$$

Owing to the relatively low input current of the input amplifier 24 the relationship $U_2 = R_1 \times I_1$ (Eq. 2) applies. The output voltage of the integrator is $$U_2 = V_i \times U_1(t) dt \quad \text{(Eq. 3)}$$

By differentiation of this equation one obtains $$\frac{dU_2(t)}{dt} = V_i \times U_1(t).$$

After rearrangement and insertion of equations 1 and 2 the following applies for $$U_a(t) = -\frac{V_a}{V_i} \times R_1 \times \frac{dI_1(t)}{dt}$$

Thus the output voltage of the differentiating stage is equal to the time derivative of the current from the mass spectrometer which is to be measured. The steadily increasing measurement current caused by the steadily increasing argon pressure makes itself felt at the output as a constant voltage which may be subtracted if required.

Possibly required range switching may be performed through branch 31 by switching, at an increasing output voltage from the integrator, a resistance R$_2$ (33) the value of which is lower than R$_1$, into the input of the differentiating stage.

This switching action may be performed depending on the voltage, for example, through a Zener diode 32. A reduction of the transfer constant of the differentiating stage may be attained by correspondingly increasing gain of amplifier 29.

The advantages of the implementation of a current differentiating stage described above may be summarized as follows:

The sensitive input amplifier need not amplify the full background current.

The differentiating element is not directly connected to the high-impedance input circuit; thus the design for a range switching arrangement is simplified.

A design of the amplifier as a general filter permits further matching to the actual measurement task with respect to noise, drift and other sources of interference.

What is claimed is:

1. Search gas detector (1), for leak detection instruments, comrising:

a gas inlet (2);

a vacuum pump (3, 6);

an apparatus through which a presence of search gas is recorded;

said vacuum pump (3, 6) being able to substantially pump all reactive gases;

said search gas recording apparatus (4) being able to detect an enrichment of said search gas;

said gas inlet (2) being effective for permitting substantially only said search gas to pass therethrough:

a first chamber (5') to which said gas inlet (2) and said search gas recording apparatus (4) are connected;

a second chamber (5") to which said vacuum pump (3, 6) is connected;

said first and second chambers (5', 5") being connected by a constrictive line (10); and said second chamber (5") having a relatively large volume compared to a volume of said first chamber (5').

2. Search gas detector (1) according to claim 1, wherein said vacuum pump (3, 6) is an adsorption pump with a getter material that is passive with respect to any noble gas.

3. Search gas detector (1) according to claim 1, wherein the gas inlet (2) comprises a polymer diaphragm (11).

4. Search gas detector (1) according to claim 1, wherein the gas inlet (2) comprises a heated quartz window (16).

5. Search gas detector (1) according to claim 1, wherein the search gas recording apparatus (4) is a pressure gauge.

6. Search gas detector (1) according to claim 1, wherein the search gas recording apparatus (4) is a mass spectrometer.

7. Search gas detector (1) according to claim 6, wherein a differentiating stage (20) follows after the mass spectrometer (19).

* * * * *